United States Patent
Bores (10) Patent No.: US 6,409,248 B1
(45) Date of Patent: Jun. 25, 2002

(54) DUAL PIVOTING BOW ASSEMBLY FOR USE WITH A REMOVABLE SOFT TOP PORTION OF A JEEP-TOP COVER

(76) Inventor: Carol Bores, 30606 Munger, Livonia, MI (US) 48154

( * ) Notice: Subject to any disclaimer, the term of this patent is extended or adjusted under 35 U.S.C. 154(b) by 0 days.

(21) Appl. No.: 09/651,951

(22) Filed: Aug. 31, 2000

(51) Int. Cl.⁷ ................................. B60J 7/00; B60J 7/08
(52) U.S. Cl. .................. 296/122; 296/123; 296/107.07; 296/107.09
(58) Field of Search ............................ 296/107.01, 118, 296/122, 123, 107.03, 107.07, 107.09, 145; 280/56

(56) References Cited

U.S. PATENT DOCUMENTS

| | | |
|---|---|---|
| 3,195,549 A | 7/1965 | Stevens |
| 4,746,163 A | 5/1988 | Muscat |
| 4,850,634 A | 7/1989 | Taubitz |
| 5,031,949 A | 7/1991 | Sorimachi et al. |
| 5,078,447 A | 1/1992 | Klein et al. |
| 5,090,764 A | 2/1992 | Kogawa et al. |
| 5,096,251 A * | 3/1992 | Pfertner et al. |
| 5,209,544 A | 5/1993 | Benedetto et al. |
| 5,299,850 A | 4/1994 | Kaneko et al. |
| 5,301,995 A * | 4/1994 | Isler |
| 5,673,959 A | 10/1997 | Padlo |
| 5,803,529 A | 9/1998 | Perry-Bores et al. |
| 6,036,256 A * | 3/2000 | Hilliard et al. |
| 6,068,326 A * | 5/2000 | Shiromura |
| 6,095,589 A * | 8/2000 | Kinnanen et al. |

* cited by examiner

Primary Examiner—Stephen T. Gordon
Assistant Examiner—Scott Carpenter
(74) Attorney, Agent, or Firm—Gifford, Krass, Groh, Sprinkle, Anderson & Citkowski, P.C.

(57) ABSTRACT

A dual bow assembly for supporting a flexible covering member of a Jeep-type vehicle in proximity to a forward top covering member. The vehicle includes a forwardly situated seating area upon which the forward covering member is secured and a rearwardly situated storage area defined by a belt line extending around sides and a rear of the vehicle. A pair of spaced apart roll bars extend along the seating and storage area of the vehicle and the flexible covering member is associated with the vehicle storage area. A first substantially "U" shaped bow is located proximate a forward end of the vehicle storage area and envelopes the spaced apart roll bars. Opposing and linearly extending ends of the first bow each include a linkage member pivotally associated with the linearly extending ends at a first location and pivotally engaged with the vehicle belt line at a second location. A second generally U-shaped bow has first and second opposing ends secured to the storage area of the vehicle or roll bar as in the L-shaped second bow. A flexible cover includes an area defined by a top and at least one side which overlays the second U-shaped bow and which is secured to the first U-shaped bow and to at least a portion of the sides and rear of the vehicle. The first and second bows are manipulated in directions between the sides and rear of the vehicle to selectively install and remove said flexible cover from the storage area of the vehicle.

6 Claims, 8 Drawing Sheets

DUAL PIVOTING BOW ASSEMBLY FOR USE WITH A REMOVABLE SOFT TOP PORTION OF A JEEP-TOP COVER

BACKGROUND OF THE INVENTION

1. Field of the Invention

The present invention relates generally to removable and convertible vehicle top assemblies and, more particularly, to dual pivoting bow assembly for use with a removable soft top portion of a Jeep-type vehicle, the dual bow assembly being operable to selectively install and remove a cloth top rear portion to and from the vehicle.

2. Description of the Prior Art

The use of convertible and removable vehicle tops is well documented in the automotive industry. Convertible tops are advantageously used to raise and lower a vehicle's covering member depending upon the given weather conditions and the desirability of having the top down. Removable vehicle tops are also primarily employed based upon the existing weather conditions but may also be interchangeable with other and additional modified tops in the event it is desired to mount another top to the vehicle which may have a different construction.

U.S. Pat. No. 5,803,529, issued to Perry-Bores et al., teaches a mechanism for selectively installing and removing a cloth top from a jeep-type vehicle and including a separately removable and forward hard top portion fastened over a forward passenger area of the vehicle. A rearward storage area of the vehicle is defined in part by a pair of roll bars which extend to a rear of the vehicle. A first U-shaped and extensible assembly is pivotally secured to the sides of the vehicle and envelops the roll bars. A second generally U-shaped member is pivotally mounted to a rearward end of the roll bars and includes a spaced middle elongated portion. The flexible cover is draped over the second U-shaped member and is attached to the U-shaped extensible assembly and to a portion of the sides and rear of the vehicle. The second U-shaped member includes a pivot mechanism and which rotates the second member between a material installing, a material tautening and a rearward non-use position.

U.S. Pat. No. 5,673,959, issued Oct. 7, 1997 to Padlo, teaches a flexible roof support for a vehicle and which includes both a rear bow and two side bows, both the rear bow and each side bow having a short leg, a long leg and an elbow with the short and long legs are connected. The distal ends of the short legs for both the rear and side bows are pivotally attachable to the vehicle, specifically the "C" shaped extending bar of the Jeep-type vehicle, above the belt line and behind the door openings such that the side bows are alignable with the sides of the vehicle and the long legs of the side bows are alignable with the upper part of the door openings.

U.S. Pat. No. 4,746,163, issued to Muscat, teaches a combination removable panel-convertible top system which includes a rear convertible frame section and a separately attachable section which extends between the rear section and an edge of the windshield to substantially overlay the forward seating area of the vehicle. While providing a convenient and useful convertible top assembly for a passenger-type vehicle, the device of Muscat is not readily adaptable for use with other vehicle types, specifically Jeep design vehicles.

U.S. Pat. No. 4,850,634, issued to Taubitz, teaches a folding top for cross-country vehicles which includes a number of interconnected tubular members which are selectively folded and unfolded to create a skeletal structure over which is attached a covering material. The disadvantages of the Taubitz structure includes its relative complexity of design which increases the likelihood of a material failure over extended use. A further disadvantage of the folding structure of Taubitz is the inability to use the device with a Jeep-type vehicle which customarily utilizes roll bar protectors extending throughout the passenger and storage compartments of the vehicle, the existence of roll bars preventing the necessary range of motion indicated in the Taubitz disclosure.

The standard Jeep vehicle includes forwardly directed passenger and rearwardly directed storage compartments. A pair of roll bars extend throughout the passenger and storage areas and provide protection to the vehicle's occupants in the event of a rollover. Currently, two different Jeep top covers are available for use and include a soft top cover for warm weather driving conditions and a heavier hard top cover for winter driving. The disadvantages of owning two tops for use with the vehicle include the increased cost of owning more than one top, the need for storage of the unused top and the effort which must be expended in disengaging one of the tops and attaching the other.

SUMMARY OF THE PRESENT INVENTION

The present invention is a dual pivoting bow assembly for use with a rear storage area of a Jeep-type vehicle and a removable soft top covering portion associated with the vehicle. The dual bow mechanism is operable to selectively install and remove the cloth top rear portion to and from the vehicle.

In a first variant, a first substantially "U" shaped bow is located proximate a forward end of the vehicle storage area and envelopes the spaced apart roll bars. Opposing and linearly extending ends of said first bow each include a linkage member pivotally associated with the linearly extending ends at a first location, the linkage members are each further pivotally engaged with the vehicle belt line at a second location.

A second generally U-shaped bow envelopes the spaced apart roll bars and includes first and second opposing ends secured to the storage area of the vehicle. The second bow further includes opposing and elongate extending sides, each of the sides defining a substantially "L" shape pivotally secured to opposing and vertically extending portions of a roll bar stanchion of the vehicle which extends behind a driver and passenger seat.

A flexible cover has an area defined by a top and at least one side which overlays the second U-shaped bow and is secured to the first U-shaped bow and to at least a portion of the sides and rear of the vehicle. The first and second bows are manipulated in directions between the sides and rear of the vehicle and to selectively install and remove said flexible cover from the storage area of the vehicle.

According to a further preferred variant, the second generally U-shaped bow again envelopes the spaced apart roll bars, with first and second opposing ends secured to the storage area of the vehicle. The second bow in the further preferred variant includes opposing and elongate extending sides, each of the sides being translatably secured within an axially extending guide rail secured in opposing and parallel extending fashion along the sides of the vehicle belt line defined by the storage area. According to this further embodiment, the sides of the second bow terminated downwardly in trolley portions and which further includes a projecting roller which is secured within an associated guide rail. A detent is formed within spaced apart edges of each guide rail and permits the trolley end portions of the second bow to be engaged.

The flexible cover is again provided and has an area defined by a top and at least one side which overlays said second U-shaped bow and is secured to said first U-shaped bow and to at least a portion of the sides and rear of the vehicle. The first and second bows are similarly manipulating in directions between the sides and rear of the vehicle and to selectively install and remove said flexible covering member from the storage area of the vehicle.

BRIEF DESCRIPTION OF THE DRAWINGS

Reference will now be made to the attached drawings, when read in combination with the following detailed description, wherein like reference numerals refer to like parts throughout the several views, and in which.

DESCRIPTION OF THE PREFERRED EMBODIMENTS

Figure 1:
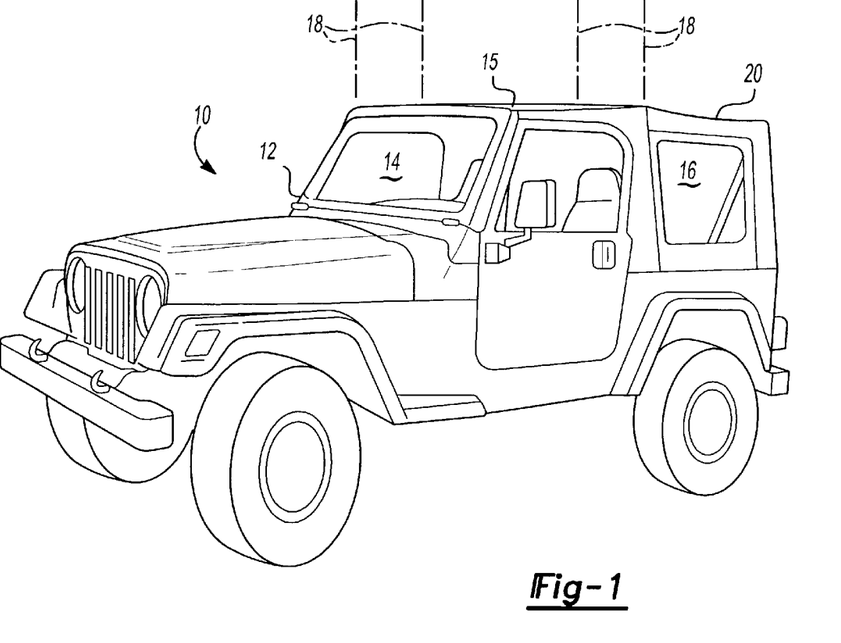
FIG. 1 is a perspective view of a Jeep-type vehicle and illustrating the flexible covering member secured over the storage area of the vehicle and in combination with a forwardly situated and separately attachable covering portion corresponding to the passenger compartment of the vehicle.

Referring to FIG. 1, a removable vehicle top assembly 10 is illustrated generally at 10 for use with a Jeep-type vehicle 12 according to the present invention. The Jeep 12 is according to the standard variety currently produced by Chrysler Automotive Corporation and has a body which includes a forwardly situated seating area 14 and a rearwardly situated storage area 16. A first covering portion, illustrated at 15, is secured to the vehicle in a fashion, such as through the use of fasteners 18 so as to overlay the area 14 positioned substantially above the passenger seating. The first covering portion 15 is typically a forward or "hard top" portion and which capable of being separately installed or removed from the vehicle 12.

Reference is also again made to the Perry-Bores U.S. Pat. No. 5,803,529 which teaches the mechanism for selectively installing and removing a cloth top and a separately removable forward top portion. The mechanism for securing the forward top portion in the present application is largely drawn from the disclosure set forth in the Perry-Bores '529 patent and, in the preferred embodiment, is a one-piece semi-rigid body secured to the vehicle, such as by the fasteners 18 previously recited.

Figure 1A:
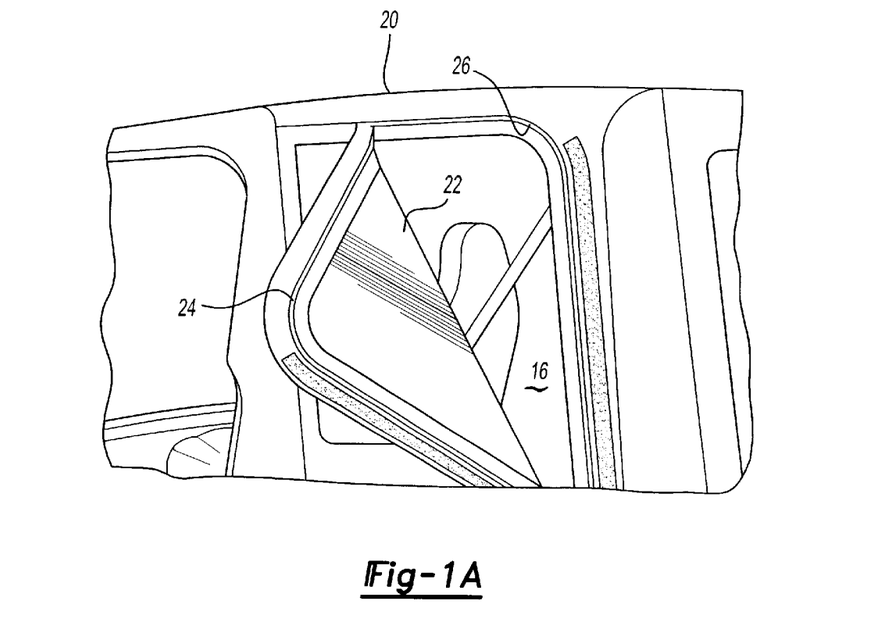
FIG. 1a is a sectional perspective view of a side of the flexible covering member and showing a zipper attachable window.
Figure 2:
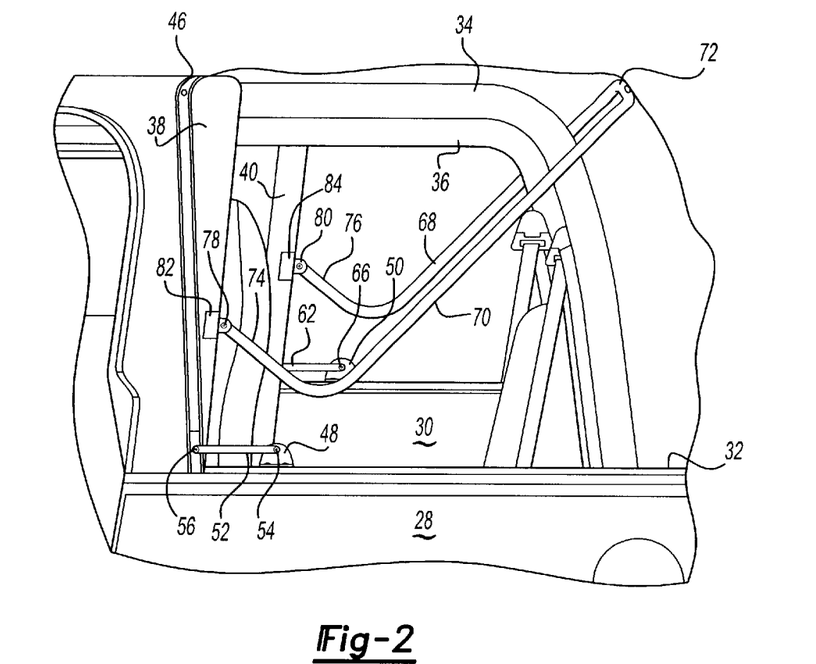
FIG. 2 is a view in section of the exposed storage area of the vehicle and illustrating the first and second pivoting bows in an up position according to the present invention.

Referring again to FIG. 1 and also to FIG. 2, a flexible covering member 20 is illustrated which is secured to the vehicle 12 proximate the rearward storage area 16 and either in combination or independently of the forward covering portion 15. The covering member 20 is preferably constructed of a flexible cloth waterproof material. The flexible covering member 20 generally includes a first side, a second side and a rear side as illustrated. Referring again to FIG. 1a, a window 22 is illustrated which is capable of being secured to an opening in the associated side of the covering member 20, such as is also best illustrated in FIG. 1, and by a first zippered edge 24 which meshingly engages with a corresponding zippered edge 26 formed along the periphery of opening in the covering member 20. It is further understood that additional and similarly configured zippered windows may be installed in like shaped openings formed along either of the sides or rear of the flexible covering member 20 within the scope of the present invention. The side and rear windows may further be removed as desired without compromising the overall attachment of the covering member 20 with the vehicle 12.

Referring further to FIG. 2, the rearwardly situated area 16 of the Jeep 12 is further defined by a belt line including a first side 28, a second side 30 and a rear side 32. First and second roll bars are indicated at 34 and 36 and which extend along the length of the passenger 14 and storage 16 areas of the Jeep vehicle and are spaced apart towards opposite sides of the Jeep. Although not shown in their entirety, the roll bars 34 and 36 extend from a position forwardly of the passenger seating area 14 in substantially level fashion along the length of the vehicle and curve downwardly towards the rear 32 of the vehicle in a substantially L-shape. Also illustrated in FIG. 2 are opposing and vertically extending stanchion portions 38 and 40 which interconnect with the roll bars 34 and 36 and which also include a transverse extending portion (hidden from view) which extends between the vertical end stanchion portions 38 and 40 and behind both the driver and passenger seats. The roll bars 34 and 36, end stanchion portions 38 and 40 and interconnecting and transverse extending stanchion portion combine to provide the safety feature of protecting the occupants in the event the vehicle overturns and are a standard feature on most Jeep vehicles.

The dual bow construction according to the present invention will now be described in detail. The double bow construction also contributes to the overall improvement over current Jeep-type covers and methods for attaching in that facilitates fast and convenient engagement and disengagement of the rear flexible covering member forming a part of the hard/soft split-top assembly of the Jeep and which may be used as a year round accessory with the vehicle. The dual bow construction further takes advantage of the arrangement of the roll bars to provide an easily attachable and removable flexible covering member.

Figure 3:
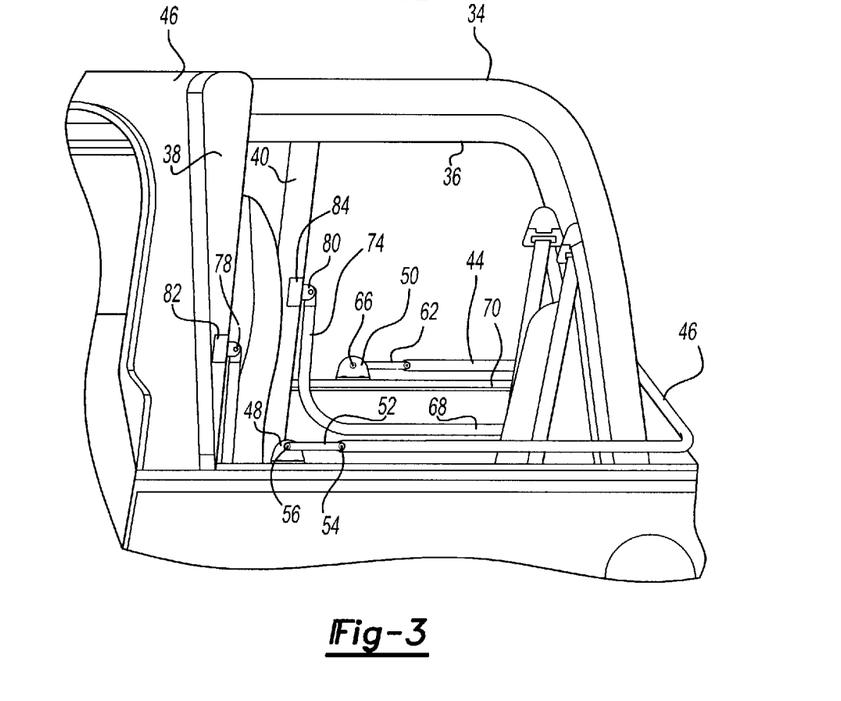
FIG. 3 is a view similar to that shown in FIG. 2 and illustrating the first and second pivoting bows in a down position.
Figure 4:
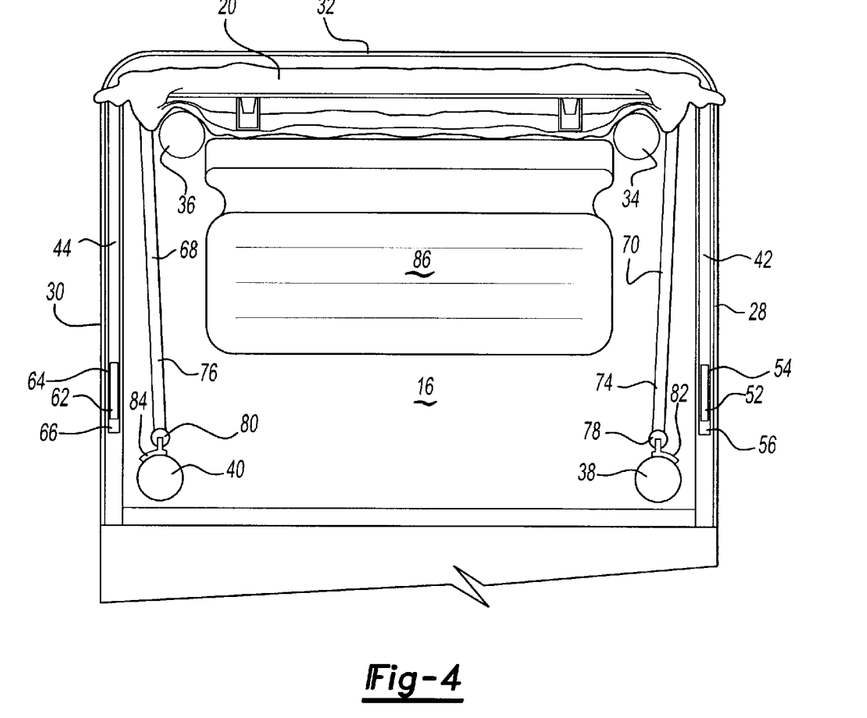
FIG. 4 is a downward looking view of the storage compartment of the Jeep vehicle and showing the first and second bows in the down position also illustrated in FIG. 3.

Referring again to FIG. 2, as well as FIGS. 3 and 4, a first generally U-shaped and extensible assembly is provided and includes a first linearly extending end 42, a second opposing and linearly extending end 44 and a central and interconnecting member 46. The opposing and linearly extending ends 42 and 44 are pivotally connected to the first 28 and second 30 sides of the vehicle 12, respectively, by means of brackets 48 and 50.

Figure 5:
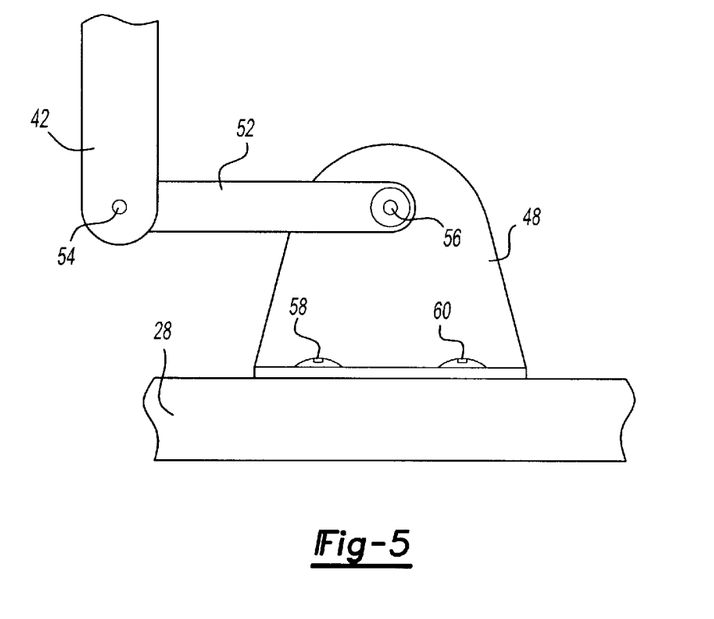
FIG. 5 is an enlarged sectional view of one of the pair of brackets mounted to opposite sides of the belt line of the vehicle and to which the pivoting linkage bow is secured.

Each of the first and second extending ends 42 and 44 of the first bow include a pivotally secured linkage member. Specifically, a first linkage member 52 is illustrated which is pivotally secured to the first extending end 42 of the bow, at a first location 54, and which is pivotally secured to the bracket 50 at a second location 56. See also the enlarged sectional view of FIG. 5 and which shows the first of the brackets, at 48, secured atop the vehicle belt line associated with the first side 28 by means of downwardly engaging fasteners 58 and 60.

An identical and second linkage member 62 is pivotally connected to the second extending end 44 of the first bow, at a first location 64, and is also pivotally secured to the bracket 52 at a second location 66 (see as best illustrated in the downwardly actuated view of FIG. 3). As is further shown, with reference to FIGS. 2, 3 and 4 in combination, the sides 42 and 44 and rear 46 of the first generally "U" shaped bow extend generally upwardly from the associated sides 28 and 30 of the vehicle 12 and include rounded edges between the elongate extending ends 42 and 44 and the central interconnecting member 46 and so that the first bow envelops the roll bars 34 and 36 and stanchion portions 38 and 40.

A second generally "U" shaped bow likewise envelops the spaced apart roll bars 34 and 36 and includes a first side 68 associated with the first side 28 of the belt line, a second side 70 associated with the second side 30 of the belt line, and an interconnecting member 72 extending between the first and second sides 68 and 70. Each of the first and second sides 68 and 70 of the second bow further are configured in a substantially "L" shaped manner. As illustrated best in FIGS. 2, 3 and 4, the first side 68 includes an angled end 74 (forming the first "L" shape) and the second side 70 likewise includes an angled end 76 (forming the second "L" shaped). Each of the first and second angled ends 74 and 76 are respectively secured in pivotal fashion, such as at 78 and 80, respectively, to brackets 82 and 84 which are mounted at vertically specified locations to the vertical roll bar stanchions 38 and 40.

The flexible covering member 20 (constructed in one piece) is illustrated in outline in the generally engaged view of FIG. 2, secured to the first bow (sides 42, 44 and central member 46), draped over the second bow (sides 68, 70 and central member 72) and secured to at least a portion of the sides 28 and 30 and rear 32 of the vehicle. The flexible covering member 20 may further be secured to the first bow, and in proximity to a corresponding rear facing edge of the first covering portion 15, (not illustrated) in any appropriate fashion, such as by sewing in a retainer thereof (not shown) and attaching the retainer to the sides 42 and 44 and top 46 of the first bow. The covering member 20 may also be secured to the first bow and around the belt line of the vehicle, such as through the provision of a retainer sewn in or snap fasteners. Referring further to the actuated perspective view of FIG. 3 and the corresponding downward looking view of FIG. 4, the first and second bows are illustrated in their manipulated fashion such that they lie in a substantially horizontally arrayed position proximate the beltline of the vehicle, and in which the flexible cover 20 has been removed from over the storage compartment of the vehicle 12 and is generally stowed along the rear extending edge as best shown in FIG. 4. Referring again to FIG. 4, a rear bench seat 86 or the like may be secured within the storage area 16 of the Jeep type vehicle and is not affected by the actuation of the first and second bows and the flexible covering member 20.

Figure 6:
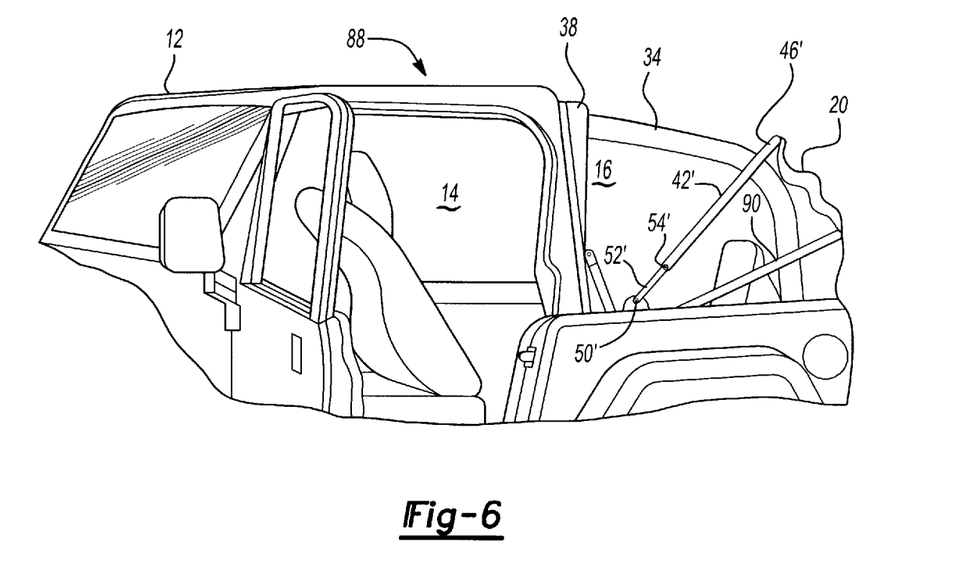
FIG. 6 is a perspective view of the dual bow mechanism for use with a soft top portion of the vehicle and according to a further preferred embodiment of the present invention.
Figure 7:
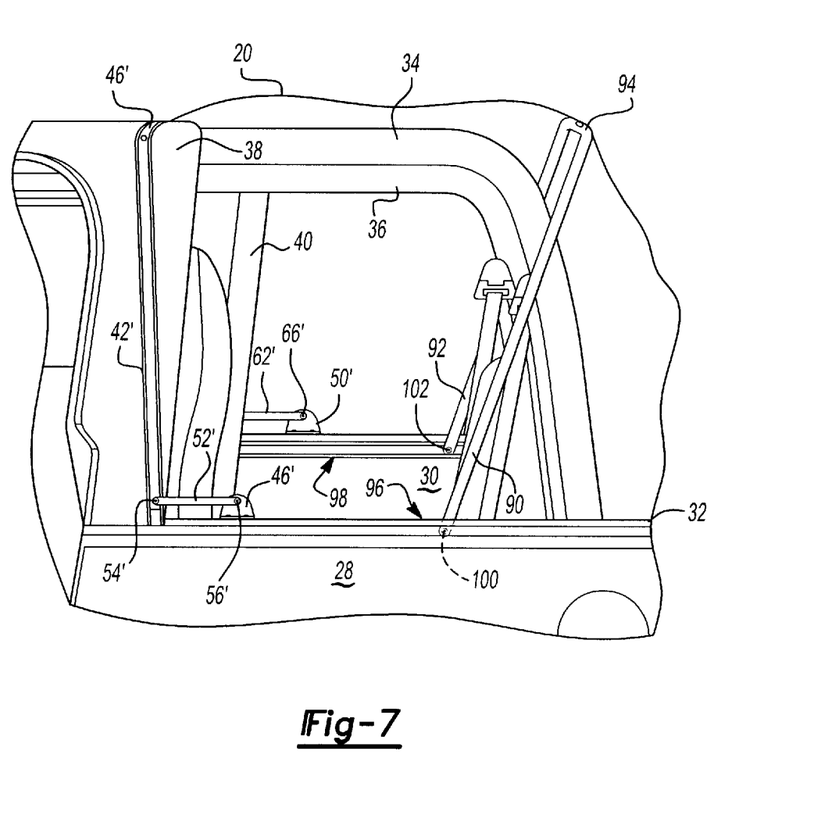
FIG. 7 is a view in section of the exposed storage area of the vehicle of the dual bow mechanism illustrated in FIG. 6 and further showing the first and second pivoting bows in an up position according to the present invention.
Figure 8:
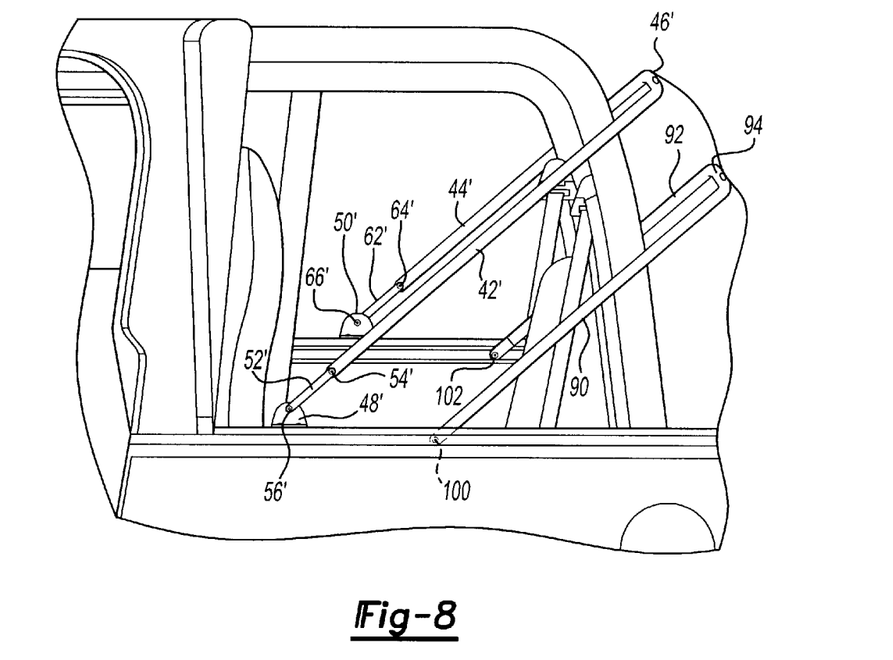
FIG. 8 is a further view in section, similar to FIG. 7, and showing the first and second bows in an intermediate and rearwardly actuating manner for retracting the flexible cover according to the present invention.

Referring now to FIGS. 6–8 a dual bow assembly is generally illustrated at 88 according to a further preferred variant of the present invention and which again includes a first bow constructed substantially identically as previously described and including a first generally U-shaped and extensible with a first linearly extending end 42', a second opposing and linearly extending end 44' and a central and interconnecting member 46'. The opposing and linearly extending ends 42' and 44' are pivotally connected to the first 28 and second 30 sides of the vehicle 12, respectively, by means of brackets 48' and 50'.

Each of the first and second extending ends 42' and 44' of the first bow include a pivotally secured linkage member. Specifically, a first linkage member 52' is illustrated which is pivotally secured to the first extending end 42' of the bow, at a first location 54', and which is pivotally secured to the bracket 50' at a second location 56'.

Figure 9:
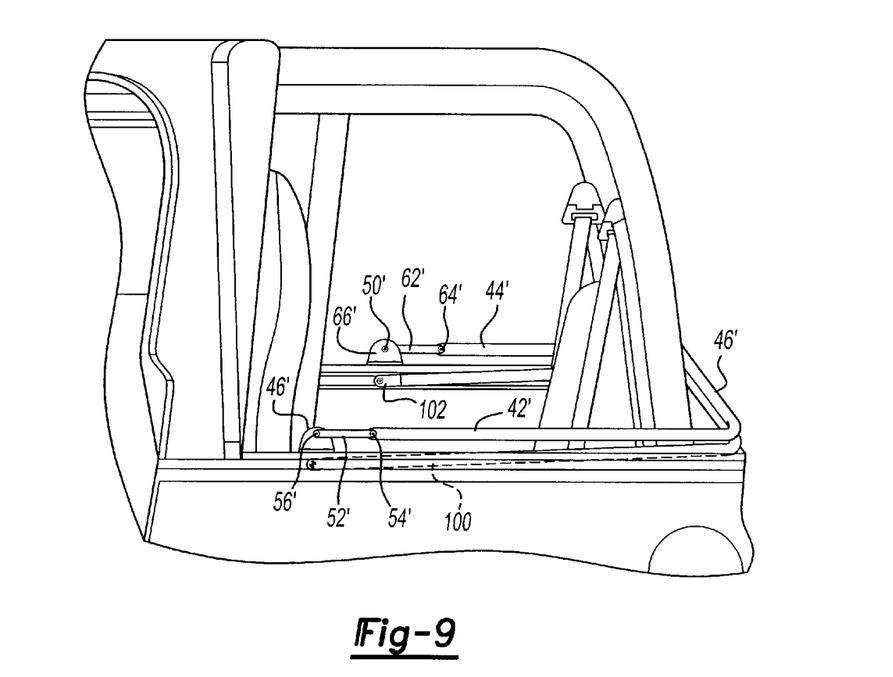
FIG. 9 is a yet further view in section of the exposed rear storage area of the Jeep type vehicle and illustrating both the first and second bows in a position corresponding to a retracted and non-use position of the cover.

An identical and second linkage member 62' is pivotally connected to the second extending end 44' of the first bow, at a first location 64', and is also pivotally secured to the bracket 52 at a second location 66' (see as best illustrated in the downwardly actuated view of FIG. 3). As is further shown, again with reference to the up, intermediate and downwardly actuated views of the first bow in FIGS. 7, 8 and 9, in combination, the sides 42' and 44' and rear 46' of the first generally "U" shaped bow again extend generally upwardly from the associated sides 28 and 30 of the vehicle 12 and include rounded edges between the elongate extending ends 42' and 44' and the central interconnecting member 46' and so that the first bow envelops the roll bars 34 and 36 and stanchion portions 38 and 40.

Referring again to FIGS. 6–9, a second bow is illustrated according to the further preferred embodiment and, again similarly to the first bow, is generally "U" shaped in configuration and envelops the spaced apart roll bars 34 and 36. The second bow includes a first elongate and extending side 90 associated with the first side 28 of the belt line, a second opposing and elongate extending side 92 associated with the second side 30 of the belt line, and an interconnecting member 94 extending between the first and second sides 90 and 92.

Each of the opposing and elongate extending sides 90 and 92 each of said elongate extending sides of said second bow terminates in a lower trolley portion and which are in turn secured in opposing and parallel extending fashion within axially extending guide rails 96 and 98 secured in opposingly facing manner to the first and second sides 28 and 30 of the vehicle belt line. Specifically, the first side 90 includes a lower trolley portion, specifically in the form of a roller 100 (see in phantom in FIGS. 7–9) extending from the bottom end of the first side 90 and which is mounted within the first axially extending guide rail 96. Likewise, the second side 92 includes a roller 102 extending from the bottom end of the second side 92 and which is mounted within the second axially extending guide rail 98.

Figure 10:
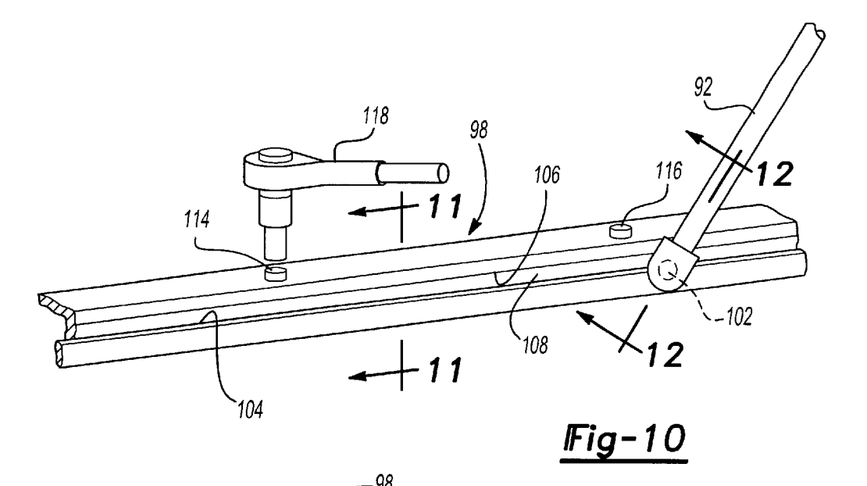
FIG. 10 is a partial view of a portion of the vehicle belt rail and illustrating the manner of securing the trolley portions of the second and sliding rear bow for translation along the sides of the belt rail.
Figure 11:
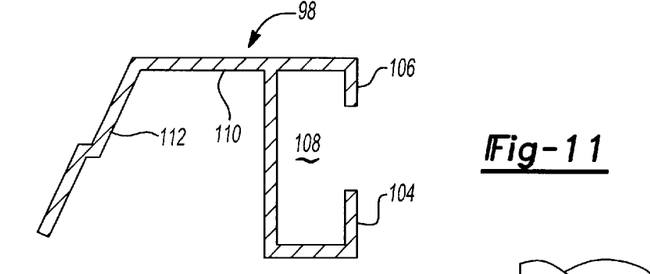
FIG. 11 is a cutaway view taken along line 11—11 of FIG. 10 and further showing the cross sectional configuration of the belt rail according to the further preferred embodiment of the present invention.
Figure 12:
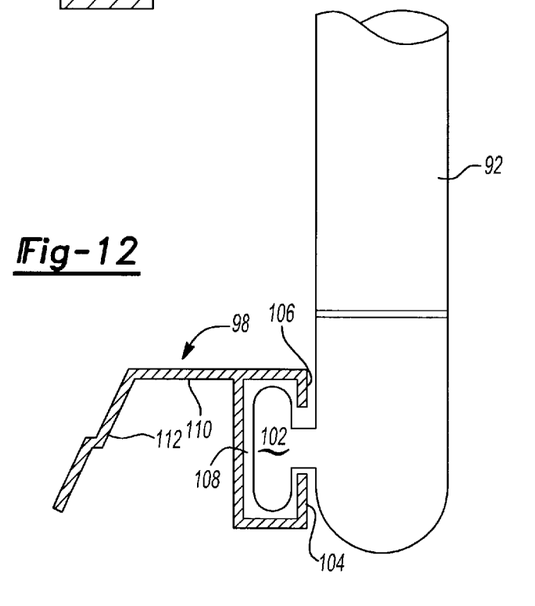
FIG. 12 is a cutaway view taken along line 12—12 of FIG. 10 and which better illustrates the translatable aspect of the second bow.
Figure 13:
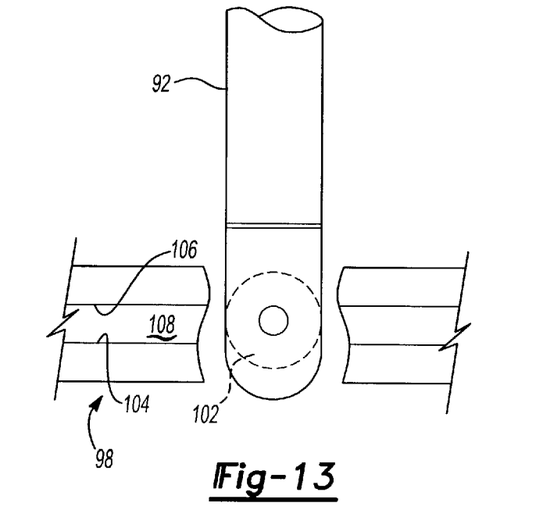
FIG. 13 is a ninety degree rotated view of the second bow portion illustrated in FIG. 12.

Referring further to FIG. 10, a sectional view is illustrated of a length of the second guide rail 98 and which further includes opposing and spaced apart edges 104 and 106 which define therebetween an inwardly facing and elongate extending channel 108 for receiving and for permitting axial translation of the selected roller 102. Additional cutaway views of FIGS. 11, 12 and 13 illustrate in cross section the configuration of the guide rail 98 and the manner in which the roller 102 of the second side 92 seats within the extending channel 108.

Referring further again to FIGS. 11 and 12, the construction of the guide rail 98 illustrated in cross section further includes a generally horizontally extending bracket 110 and an interconnecting and generally angled bracket 112. The bracketry 110 and 112 facilitates the engagement of the guide rail 98 to the associated side of the vehicle belt line and this can be accomplished, such as is shown in FIG. 10, by the provision of mounting bolts 114 and 116 engaging through the guide rails and associated apertures (not shown) in the sides of the vehicle. A ratchet 118 or like tool can be utilized to fasten the guide rails 96 and 98 in place.

Figure 14:
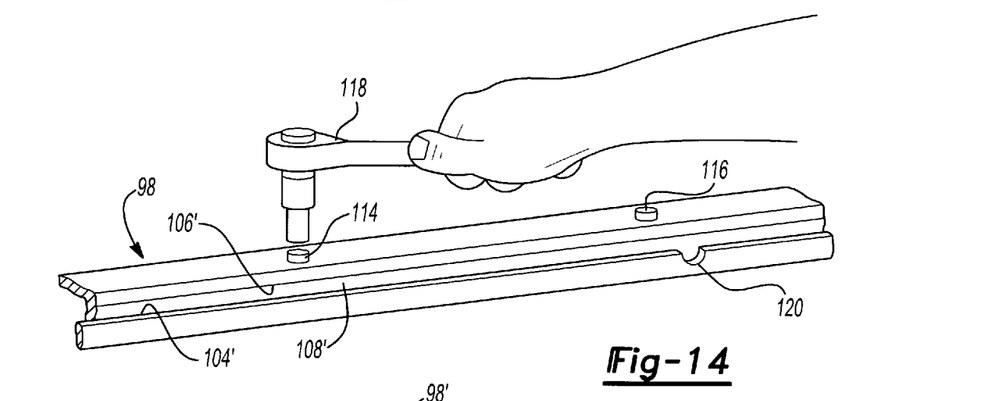
FIG. 14 is a view of a portion of the vehicle belt rail, similar to that shown in FIG. 10, and further illustrating the manner in which the lower trolley portions of the second bow are secured within the belt rail according to the present invention.
Figure 15:
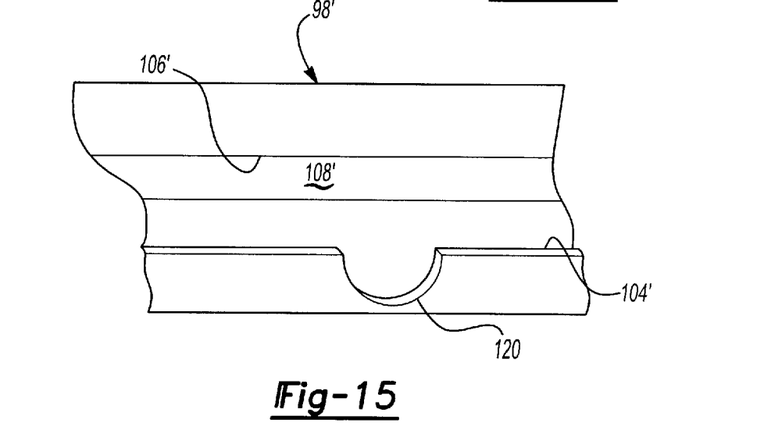
FIG. 15 is an enlarged view of the section indicated at 15—15 in FIG. 14.
Figure 16:
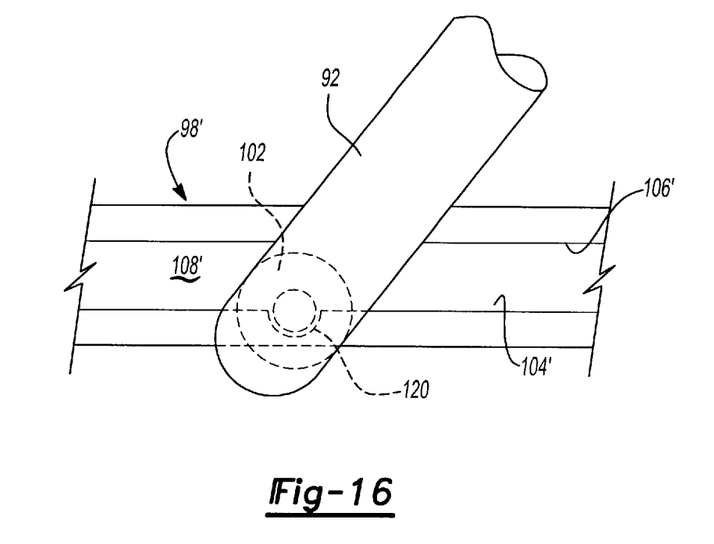
FIG. 16 is a view similar to that shown in FIG. 15 and illustrating the manner in which the second bow is installed into the belt rail.

Referring to FIG. 14, a sectional view of a second guide rail 98' similar in regards to that shown in FIG. 10 is illustrated and which again includes the features of opposing and spaced apart edges 104' and 106' which define therebetween an inwardly facing and elongate extending channel 108' for receiving and for permitting axial translation of the selected roller 102. The variant 98' of the guide rail includes a semicircular shaped detent 120 formed within the spaced apart edge 104'. As best shown in the additional sectional views of FIGS. 14 and 16, the purpose of the detent 120 is to facilitate insertion of the associated roller 102 within the guide rail 98' so that it axially translates in seating fashion along the channel 108' formed within the guide rail. Although not clearly illustrated, it is understood that the first guide rail 96 is constructed in substantially identical fashion, therefore a repetitive description of its features is not needed.

Figure 17:
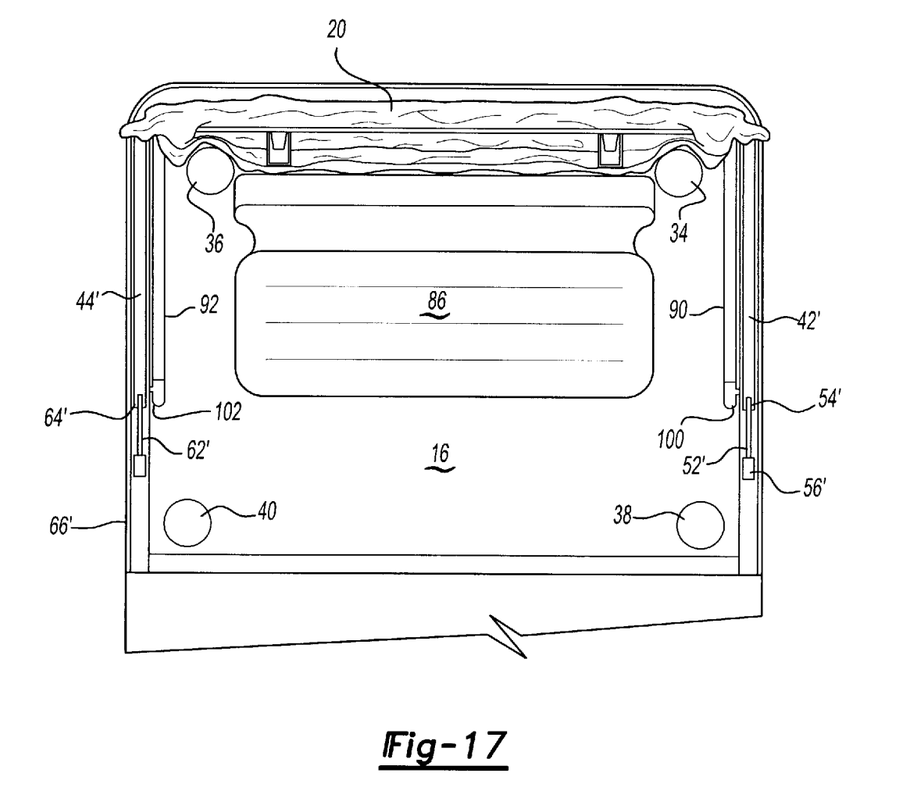
FIG. 17 is downward looking view of the storage compartment of the Jeep vehicle and showing the first and second bows hidden in the down position also illustrated in FIG. 9.

The flexible covering member 20 is illustrated again in outline in both the perspective view of FIG. 6, the generally engaged position of FIG. 7 and the intermediate position of FIG. 8 and, similarly to the first preferred embodiment, is secured to the first bow (sides 42', 44' and central member 46'), draped over the second bow (elongate extending sides 90, 92 and central member 94) and secured to at least a portion of the sides 28 and 30 and rear 32 of the vehicle. Referring further to the actuated perspective views of FIGS. 7–9, in succession, and the corresponding downward looking view of FIG. 17, the first and second bows are illustrated in their manipulated fashion such that they lie in a substantially horizontally arrayed position proximate the beltline of the vehicle, and in which the flexible cover 20 has been removed from over the storage compartment of the vehicle 12 and is generally stowed along the rear extending edge.

Having described my invention additional embodiments will become apparent to those skilled in the art to which it pertains without deviating from the scope of the amended claims.

I claim:

1. A dual bow assembly for supporting a flexible covering member of a Jeep-type vehicle, the vehicle including a forwardly situated seating area and a rearwardly situated storage area defined by a belt line extending around sides and a rear of the vehicle, a pair of spaced apart roll bars extending along the seating and storage area of the vehicle and the flexible covering member being associated with the vehicle storage area, said dual bow assembly comprising:

a first substantially "U" shaped bow adapted to being located proximate a forward end of the vehicle storage area and enveloping the spaced apart roll bars, opposing and linearly extending ends of said first bow each including a linkage member pivotally associated with said linearly extending ends at a first location, said linkage members each pivotally engaging the vehicle belt line at a second location;

a second generally U-shaped bow enveloping the spaced apart roll bars and having first and second opposing ends adapted to being secured to the storage area of the vehicle;

a flexible cover having an area defined by a top and at least one side which overlays said second U-shaped bow and is secured to said first U-shaped bow and to at least a portion of the sides and rear of the vehicle; and said first bow and said second bow pivoting about a pivot point and in directions between the sides and rear of the vehicle and to selectively install and remove said flexible cover from the storage area of the vehicle.

2. The dual bow assembly as described in claim 1, further comprising first and second brackets secured at opposite side locations to the vehicle belt line, said brackets defining said pivotal engagement with said linkage members of said first bow.

3. The dual bow assembly as described in claim 1, further comprising means for pivotally moving said first and second bows between a material installing position, a material tautening position and a retracted non-use position.

4. The vehicle top assembly as described in claim 1, further comprising a plurality of fasteners for securing a first covering portion atop the passenger compartment of the vehicle.

5. The vehicle top assembly as described in claim 1, further comprising at least one zipper attachable window to a selected one of a first side, second side and rear side of the flexible covering member, said at least one zippered window being removable from said covering member when in an installed position and without affecting the integrity of the installed covering member.

6. A dual bow assembly for supporting a flexible covering member of a Jeep-type vehicle, the vehicle including a forwardly situated seating area and a rearwardly situated storage area defined by a belt line extending around sides and a rear of the vehicle, a pair of spaced apart roll bars extending along the seating and storage area of the vehicle and the flexible covering member being associated with the vehicle storage area, said dual bow assembly comprising:

- a first substantially "U" shaped bow adapted to being located proximate a forward end of the vehicle storage area and enveloping the spaced apart roll bars, opposing and linearly extending ends of said first bow each including a linkage member pivotally associated with said linearly extending ends at a first location, said linkage members each pivotally engaging the vehicle belt line at a second location;
- a second generally U-shaped bow enveloping the spaced apart roll bars and having first and second opposing ends adapted to being secured to the storage area of the vehicle, said second bow further comprising opposing and elongate extending sides, each of said sides defining a substantially "L" shape pivotally secured to opposing and vertically extending portions of a roll bar stanchion of the vehicle which extends behind a driver and passenger seat;
- a flexible cover having an area defined by a top and at least one side which overlays said second U-shaped bow and is secured to said first U-shaped bow and to at least a portion of the sides and rear of the vehicle; and
- said first bow and said second bow pivoting about a pivot point and in directions between the sides and rear of the vehicle and to selectively install and remove said flexible cover from the storage area of the vehicle.

* * * * *